May 20, 1930.  G. S. APELDORN  1,759,601
METHOD OF AND APPARATUS FOR SOFTENING WATER
Filed Aug. 25, 1926
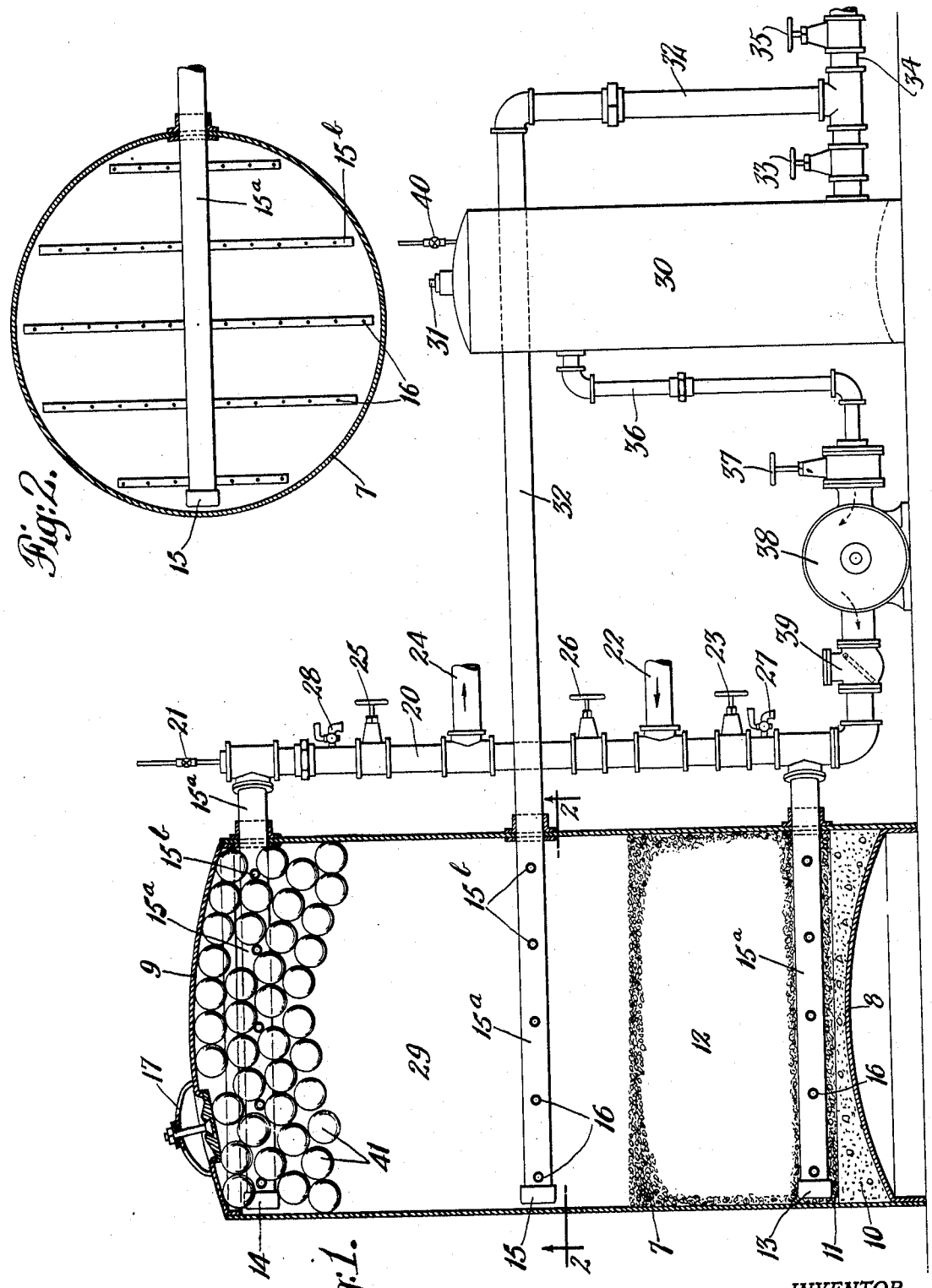
INVENTOR
Guy Scott Apeldorn
BY Synnestvedt + Lechner
his ATTORNEYS Patented May 20, 1930

1,759,601

UNITED STATES PATENT OFFICE

GUY SCOTT APELDORN, OF PHILADELPHIA, PENNSYLVANIA

METHOD OF AND APPARATUS FOR SOFTENING WATER

Application filed August 25, 1926. Serial No. 131,336.

This invention relates to an improved method of softening water as well as to certain improved apparatus which may be used in connection with such method.

The invention is particularly useful in connection with the various base exchanging materials now so well known in the art and is of especial advantage in connection with some of the synthetic base exchanging materials.

In its broader aspects the invention contemplates the provision of a method of and an apparatus for softening water which utilizes to the fullest possible extent the softening capacity of the base exchanging material employed as well as of the regenerating salt. To this end I aim to bring all of the salt into intimate contact with all of the softening material whereby to effect uniformity in the brine solution as well as in the removal of the "hardness". In this way the capacity of the water softening bed is greatly increased for each regeneration.

It is also an object of the invention to so utilize the bed of zeolite and subsequently to regenerate it as will maintain it in a loose or semi-floating condition whereby to eliminate all possibility of channelling.

I, furthermore, arrange to utilize the water softening material so that it will at no time act as a filter bed. In this way I prevent the accumulation of mud or sludge on the top of the base exchanging material as well as the necessity for so-called back-washing.

Another object of the invention is to provide a system wherein softened water is used for dissolving the regenerating salt so that no hardness is introduced during the period of regeneration thereby eliminating the reactions of hardening and softening simultaneously which would be the case were hard water employed to dissolve the salt.

It is a further object of the invention in connection with the foregoing to substantially reduce the time necessary to rid the system of regenerating solution after a regenerating operation has taken place.

I also arrange to prevent the softening material from packing against the inlet ports of the water distributor so as to ediminate to as great an extent as possible loss of softening material due to attrition.

Still another object of the invention is the provision of a water softening system in which the salt for a regenerating operation is introduced into the system in dry form with arrangement for dissolving it by passing water upwardly therethrough. In this way I prevent small particles of slate or other insoluble impurities from being carried out of the salt chamber into the softening tank or casing.

Another important object of the invention is to provide a system which will be very flexible as to capacity for softening water. To state this in other words it is my object to provide a simple softening apparatus which can be initially installed for a given capacity of softened water but which at he same time can be very readily changed so as to increase its capacity for softening water should the increasing business or demand of the user make this necessary.

These together with such other objects as are incident to my invention or which may appear hereinafter are obtained by means of a method and apparatus to be described below in connection with the accompanying drawing which discloses a preferred apparatus.

In the drawing, Fig. 1 is a diagrammatic side elevation of the apparatus with the softening tank or casing shown in section and Fig. 2 is a section on the line 2—2 of Fig. 1.

By referring to the drawing it will be seen that the softening tank or casing 7 is of standard construction for articles of this kind and that it has the upwardly arched bottom plate 8 and the rounded top 9. In order to give a perfectly smooth flat interior surface at the bottom I prefer to fill in the space immediately above the bottom 8 with concrete, cement or other suitable material 10. In other words the material 10 becomes a permanent part of the bottom of the casing 7 in order that there may be provided a level surface 11 upon which to place the bed of water softening material 12.

I prefer to employ three distributors in my casing 7, one at the bottom just above the level surface 11, one at the top or substantially at the top and a third one somewhere between these two distributors at a point which is preferably just above the upper level of the bed of water softening material. These distributors I have numbered in the order in which they have been mentioned as 13, 14 and 15. The distributors are preferably counterparts of one another and are illustrated in bottom plan in Fig. 2 from which figure it will be seen they comprise a central rib-like inlet conduit 15$^a$ with a plurality of outwardly extending distributor arms 15$^b$. The apertures 16 are in the arms 15$^b$ and it will be seen that they are arranged to face downwardly.

The top 9 is provided with a suitable man hole 17.

At the side of the tank the bottom and top distributors are connected by a vertical length of piping 20 which is provided with a vent 21 at the top. The hard water comes in thru the pipe 22 to the bottom distributor 13 under the control of the hard water valve 23 and the softened water passes outwardly thru the upper distributor 14 to the outlet pipe 24 under the control of the soft water valve 25. Between the inlet 22 and the outlet 24 is what I have termed the by-pass valve 26 which is normally kept shut except during periods of regeneration when it is desired to send hard water thru the consuming system or circuit not shown. The pipe 20 is also provided with the hard water test cock 27 and the soft water test cock 28.

It will therefore be seen that my invention involves what is known as an "upflow" of the water to be softened. This tends to keep the bed of water softening material in a loose condition with the particles, as it were, semi-floating in the free board space 29 between the normal or quiescent top of the bed and the top of the casing.

The balance of the apparatus illustrated is primarily concerned with regeneration and will now be described in detail. When the base exchanging capacity of the softening material 12 has been exhausted the salt tank 30 is initially charged with the proper amount of dry salt thru the so-called salt opening 31. The bottom of the tank 30 is connected to the middle distributor 15 by means of the pipe 32 which is under the control of the valve 33. Opposite the point of entry of the pipe 32 into the tank 30 there is coupled a drain pipe 34 under the control of the valve 35.

The upper portion of the tank 30 is connected to the bottom distributor 13 by means of the pipe 36 in which pipe are located the hand valve 37, the pump 38 and the check valve 39 in the order named. The top of the salt tank 30 is provided with a vent 40.

When regeneration is to take place the valves 23 and 25 in the pipe 20 are closed and the vent 21 is opened. The valves 33 and 37 are opened as well as the vent 40 in the salt tank and the valve 35 is closed. The softened water from above the water softening bed will then flow down and outwardly thru the distributor 15 into the bottom of the tank 30 finally reaching the pipe 36 and overflowing to the pump 38. The pump is set in motion and the water from the tank 30 carrying the salt in solution is delivered past the check valve 39 into the casing 7 thru the bottom distributor 13. The solution then passes upwardly thru the bed of softening material 12 and then outwardly thru the distributor 15 and back to the tank 30 in a continuous cycle.

It will be seen from the foregoing that the water to be softened as well as the salt solution used for regenerating the base exchanging material is passed in an upward direction thru such material. At no time, therefore, is this bed of material made to function as a filter and at all times the particles which compose it are in a free and loose condition so that they can "boil" upwardly into the free board space 29. At no time will there be "channelling" of the fluids thru the bed of softening material each particle thereof being brought into intimate contact either with the hard water or with the salt solution so that its full base exchanging capacity may be utilized or the entire softening effect made available.

The circulation of the regenerating solution as distinguished from the usual practice where it is simply allowed to stand in the casing for a certain length of time ensures the most thorough regeneration as well as the most efficient and economical utilization of the brine.

When regeneration has been completed the pump is, of course, stopped and the salt solution within the tank 30 is allowed to drain out thru the pipe 34 by opening the valves 33 and 35. The hard water valve 23 is then opened and hard water is allowed to enter thru the distributor 13 and pass upwardly thru the bed to displace the regenerating solution entrapped therein. This also passes outwardly thru the distributor 15 to the drain 34, the valve 33 being closed. The tank is then allowed to become full of water and when the test cock 28 shows that the water is entirely free from salt the soft water valve 25 may be opened so that soft water can again be delivered to the consuming circuit or system thru the pipe 24.

Inasmuch as the water for displacing the salt solution also passes upwardly thru the bed of softening material there is never any filtering effect imposed upon the bed and the particles are never allowed to pack as they would were the circulation in the reverse direction.

One important part of my apparatus remains to be described. In the upper free board portion of the casing 7 I provide a space or volume filling material 41 which may be of several different types although I prefer to constitute it of a plurality of floating objects as shown. The lowermost ones of these objects will, of course, be immersed in the water due to the pressure of those above but each one of them would be capable of floating upon the top of the water were it alone in the tank. For the purpose I suggest a plurality of hollow balls preferably of glass although it is to be distinctly understood that almost any material might be used.

The total number or volume of these floating objects is initially arranged to bear a certain definite relation to the amount of water softening material in the system and its water holding capacity which latter, of course, is chiefly determined by the size of the casing 7 and the size of the salt tank 30. In other words when an installation is made it is intended that for a given charge of salt the resulting brine solution will be of just the proper density for the most efficient results as determined by the quantity of base exchanging material present in the casing and the number of floating objects 41. At some later time should it be desired to increase the water softening capacity of the installation all that it will be necessary to do will be to add to the water softening bed and detract from the number of floating objects 41.

Furthermore when the water in the upper portion of the casing is drained out through the distributor 15 into the salt tank 30 the floating objects 41 will of course settle downwardly until they actually rest upon the top of the bed of softening material. In his way they will force whatever amount of water there may be between the distributor 15 and the top of the bed outwardly through the said distributor so that when a regenerating operation is to be performed there will be less salt solution below the distributor 15 for upward removal by the incoming hard water as hereinbefore described.

In addition to the foregoing the presence of the floating objects decreases the volume of water above the bed of softening material and therefore decreases the time necessary in which to drain the water into the salt tank. They also decrease the amount of water used in each regeneration since less water is required to refill the casing. They do not in any way restrain the freedom of the particles of the water softening bed nor are they sufficient to materially affect or restrict the flow of water.

In conclusion I wish to point out that in a method and apparatus employing upflow at all times with its many incidental advantages I have provided for a great reduction in the amount of time required to rid the system of salt solution after a regenerating operation. This is apparent because the volume of water in the casing from the bottom to the center distributor is materially less than that which it takes to completely fill the casing which latter volume of water would have to be removed were the salt solution to be washed out through the top distributor. It is also apparent that this middle distributor greatly reduces the amount of water required to clear the system of the salt solution since there is not so great a volume of water present with which the regenerating solution can mix. The upward discharge of salt solution is therefore more concentrated per gallon of water utilized.

The upward flow arrangements furthermore prevent the softening material from being crowded and packed against the lower distributor and thereby overcome any tendency to loss of softening material by attrition due to the action of the water. It also prevents all possibility of choking up the small openings in the distributor. By facing the openings in the distributor downwardly against the bottom of the tank I substantially reduce the velocity effect of the water and thereby eliminate wear and tear on the softening material which would otherwise be occasioned were the jets of water arranged to discharge directly into the water softening bed.

The check valve 39 makes it at all times impossible for any pressure to be brought to bear on the top of the bed of softening material by eliminating all possibility of down flow.

I claim:—

1. In water softening apparatus the combination of a casing, a bed of water softening material therein, a distributor at the bottom of the bed, a second distributor at the top of the bed, a third distributor at the top of the casing, a salt tank, a water inlet near the bottom of the salt tank, a water outlet near the top of the salt tank, a source of hard water connected to the bottom distributor, a soft water outlet connected to the top or third distributor, a connection between the second distributor and the tank inlet, a connection between the tank outlet and the bottom distributor, and a pump in said last mentioned connection.

2. In water softening apparatus the combination of a casing, a bed of water softening material therein, a distributor at the bottom of the bed, a second distributor at the top of the bed, a third distributor at the top of the casing, a salt tank, a water inlet near the bottom of the salt tank, a water outlet near the top of the salt tank, a source of hard water connected to the bottom distributor, a soft water outlet connected to the top or third distributor, a connection between the second distributor and the tank inlet, a connection between the tank outlet and the bottom distributor, a pump in said last mentioned connection, and a valved drainage pipe connected to the tank inlet.

3. In water softening apparatus the combination of a casing, a bed of softening material in the lower portion thereof, means for passing water through the casing in an upward direction to flush out regenerating solution, and space filling material in the upper portion of the casing above the softening material adapted to reduce the volume of water without interfering with the flow or the action of the softening material.

4. In water softening apparatus the combination of a casing, a bed of softening material in the lower portion thereof, and space filling material in the upper portion of the casing above the softening material adapted to reduce the volume of water without interfering with the flow or the action of the softening material.

5. A water softening apparatus comprising in combination, a casing having a capacity greater than required, a bed of softening material in the lower portion thereof, a salt tank, means for draining water from above the softening material into said tank, and space filling material above the softening material adapted to reduce the volume of water which is drained into the tank so as to insure the proper density of the salt solution.

6. A water softening system comprising in combination, a casing, a bed of softening material of less size than accommodable therein, a salt tank, means for draining water from above the bed into said tank, and floating space filling means in the casing above said bed for reducing the volume of water in the system to a point where it substantially corresponds to the size of said bed.

7. In water softening apparatus the combination of a casing, a bed of water softening material therein, a port in the casing above the top of said bed, and a plurality of water displacing objects adapted to rise or fall with the level of the water.

8. In water softening apparatus the combination of a casing, a bed of water softening material therein, and a plurality of objects adapted to float on the water above said bed.

9. In water softening apparatus the combination of a casing, a bed of water softening material therein, an outlet at substantially the top of said bed adapted to drain the water from above the bed, and a plurality of objects adapted to float on the water above said bed.

In testimony whereof, I have hereunto signed my name.

GUY SCOTT APELDORN.